United States Patent [19]
Proffit

[11] Patent Number: 5,311,669
[45] Date of Patent: May 17, 1994

[54] NON-MAGNETIC PRINTING PRESS PACKING GAUGE

[76] Inventor: John D. Proffit, 1436 River Rd., Clarksville, Tenn. 37040

[21] Appl. No.: 967,112

[22] Filed: Oct. 27, 1992

[51] Int. Cl.$^5$ .............................. G01B 3/22; G01B 5/06
[52] U.S. Cl. ................................... 33/618; 33/834
[58] Field of Search ............... 33/834, 793, 802, 804, 33/806, 572, 551, 833, 617, 618, 784, 837, 544.3, 545

[56] References Cited

U.S. PATENT DOCUMENTS

| | | | |
|---|---|---|---|
| 1,863,757 | 6/1932 | McChesney | 33/834 |
| 2,840,918 | 7/1958 | Wildeman | 33/834 |
| 3,090,129 | 5/1963 | Gifford . | |
| 3,324,759 | 6/1967 | Fielding | 33/618 |
| 3,432,931 | 3/1969 | Meyer | 33/834 |
| 3,432,933 | 3/1969 | Wood | 33/834 |
| 4,450,628 | 5/1984 | Rocks | 33/833 |
| 5,075,980 | 12/1991 | Kerman | 33/618 |
| 5,084,983 | 2/1992 | Proffit et al. | 33/834 |

FOREIGN PATENT DOCUMENTS

| | | | |
|---|---|---|---|
| 0636111 | 9/1936 | Fed. Rep. of Germany | 33/837 |
| 3435860 | 1/1986 | Fed. Rep. of Germany . | |
| 219053 | 1/1942 | Switzerland . | |

*Primary Examiner*—Thomas B. Will
*Attorney, Agent, or Firm*—Jacobson, Price, Holman & Stern

[57] ABSTRACT

A printing press packing gauge is provided in the form of a channel member or saddle for lengthwise disposition along and support from a blanket cylinder with the open side of the channel member abutted and seated against the blanket cylinder and one end of the gauge including an elongated reciprocal sensor lengthwise shiftable relative to the channel member generally radially of the cylinder while an indicator spindle is mounted for lengthwise shifting longitudinally of the channel member and movement connecting structure in the form of a bellcrank pivotally supported from the channel member is provided and operatively connects the sensor with the spindle for simultaneous and equal shifting of the spindle relative to the channel member responsive to shifting of the sensor relative to the saddle member.

12 Claims, 2 Drawing Sheets

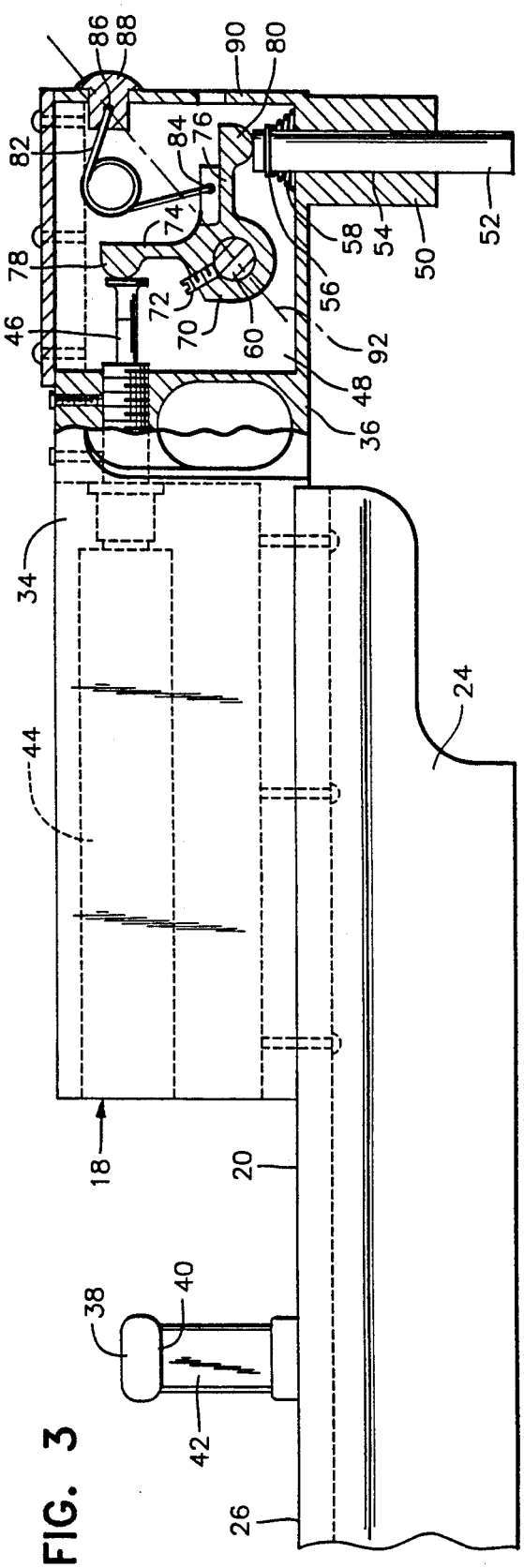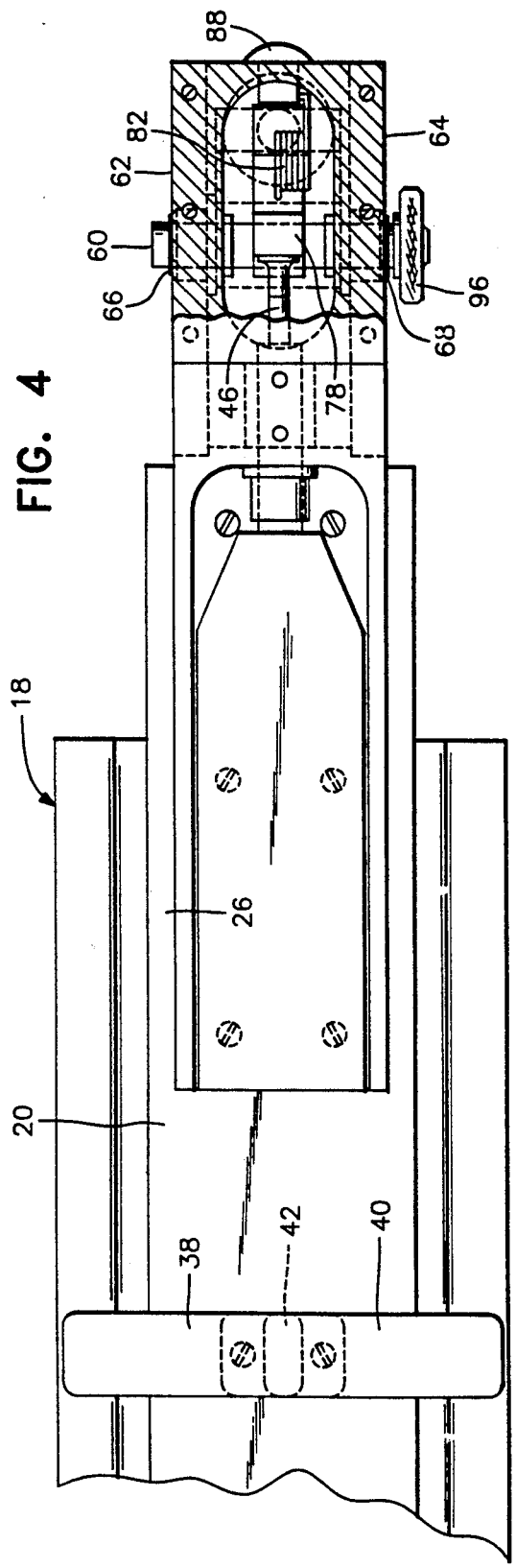

NON-MAGNETIC PRINTING PRESS PACKING GAUGE

BACKGROUND OF THE INVENTION

1. Field of the Invention

This invention relates to a device for accurately determining the exact "squeeze" between the plate on a plate cylinder of a printing press and the blanket on the blanket cylinder of the printing press. The correct "squeeze" is essential for the ink on the plate to properly transfer therefrom to the blanket and subsequently to the paper to achieve superior printing quality.

Adjustments are made before and during a printing run to maintain the exact "squeeze" and are effected by inserting a packing material beneath either the plate or the blanket and in many instances beneath both the plate and the blanket. During a printing run frequent measurements should be taken on both the plate cylinder and the blanket cylinder to ensure the "squeeze" is maintained correct.

2. Description of Related Art

Various different forms of blanket thickness gauges and other devices heretofore have been provided to determine and maintain proper "squeeze" between the plate and the blanket on a printing press in order to ensure top quality printing. Examples of these previously known gauges and other devices are disclosed in U.S. Pat. Nos. 2,840,918, 3,090,129, 3,324,759, 3,432,933, 4,450,628 and 5,084,983 as Well as German Patent 3435860 and Swiss Patent 219053. However, these previously known devices are not as readily usable and/or accurate as the packing gauge of the instant invention.

SUMMARY OF THE INVENTION

A printing press manufacturer and a printing press purchaser jointly determine the following close tolerance dimensional relationship to allow the press operator to achieve the exact "squeeze" between the plate on the plate cylinder and the blanket on the blanket cylinder of a printing press:

1. The dimensional relationship of the outer surface of the plate relative to either the plate cylinder bearer or the outer surface of the plate cylinder on a printing press without bearers.
2. The dimensional relationship of the outer surface of the blanket relative to either the blanket cylinder bearer or the outer surface of the blanket cylinder on a printing press without bearers.

When a plate is to be mounted upon the plate cylinder of a printing press, the press operator determines the thickness of the plate. The press operator is knowledgeable of the dimensional relationship of the outer surface of the plate relative to either the plate cylinder bearer or the outer surface of the plate cylinder on a printing press without bearers. Therefore, knowing the plate thickness and the dimensional relationship the press operator can determine the thickness of packing material to be inserted beneath the plate on the plate cylinder. Likewise, when a blanket is to be mounted upon the blanket cylinder of a printing press, the press operator determines the thickness of the blanket. The press operator is knowledgeable of the dimensional relationship of the outer surface of the blanket relative to either the blanket cylinder bearer or the outer surface of the blanket cylinder on a printing press without bearers. Therefore, knowing the blanket thickness and this dimensional relationship, the press operator can determine the thickness of packing material to be inserted beneath the blanket on the blanket cylinder.

After the plate and blanket have been mounted on the plate cylinder and blanket cylinder, the desired "squeeze" between the plate and the blanket will be a median of 0.076 mm when using a conventional blanket and a median of 0.165 mm when using a compressible blanket. The correct packing beneath the plate and the blanket develops the exact "squeeze" as to the specific printing press specifications and results in the material subsequently printed being sharp, clean and with ink at full density.

However, after one thousand plus impressions have been run on a press, the "squeeze" between the plate and the blanket tends to decrease and results in a lack of ink transferring to the blanket from the plate. This reduction in "squeeze" is due to the packing beneath the plate and/or the blanket being repeatedly compressed and experiencing a reduction in effective thickness.

When printing quality begins to deteriorate due to reduced "squeeze", the press operator will stop the printing press and may use the instant invention to measure the dimensional relationship of the outer surface of the plate relative to either the plate cylinder bearer or the outer surface of the plate cylinder on a printing press without bearers. Likewise, dimensional relationship measurements may be made on the blanket cylinder. The instant invention will allow the press operator to quickly and accurately make these measurements to determine the additional packing material to be inserted beneath either the plate or the blanket or beneath both the plate and the blanket to restore the exact "squeeze" as to the specific printing press specifications.

While various different forms of blanket thickness gauges and other devices have been provided to help determine the "squeeze", most of these previously known devices are not reliable. Further, many previous devices are difficult to properly use and some cannot be used to make measurements on a plate cylinder.

Accordingly, the main object of this invention is to provide a packing gauge which will enable differential measurements to be easily and effectively made on both the plate and blanket cylinders of a printing press between the outer surface of the plate or blanket relative to the respective bearer or cylinder surfaces on a press without bearers.

Another very important object of this invention is to provide a gauge in accordance with the preceding object and which also may be used along the axial length of a blanket in order to locate thin areas of the backing for the blanket.

Still another important object of this invention is to provide a gauge which may be used to accurately determine the "squeeze" between the plate and the blanket of a printing press, even by inexperienced persons.

Yet another object of this invention is to provide a gauge in accordance with the preceding objects and which does not require any adjustments according to different diameter plate and blanket cylinders.

A further important object of this invention is to provide an elongated gauge in accordance with the preceding objects for disposition along the axial length of a blanket and equipped with a generally midlength elongated handle disposed transverse to the length of the gauge to thereby enable ready placement of the gauge along the axial length of a blanket with slight forearm oscillation being sufficient to properly seat the gauge upon the blanket and to maintain pressure applied to the blanket along a generally radial path of the associated printing press cylinder evenly throughout the length of the gauge in order to ensure proper readings by the gauge in locating thin areas of the backing for the blanket.

A final object of this invention to be specifically enumerated herein is to provide a gauge in accordance with the preceding objects and which will conform to conventional forms of manufacture, be of simple construction and easy to use so as to provide a device that will be economical feasible, long-lasting and relative trouble fee in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary side elevational view of the gauge with the end thereof supporting the digital indicator actuating mechanism being broken away and illustrated in vertical section; and FIG. 4 is a fragmentary top plan view of the gauge with the last mentioned end thereof being partially broken away and illustrated in horizontal section.

DESCRIPTION OF THE PREFERRED EMBODIMENT

Figure 1:
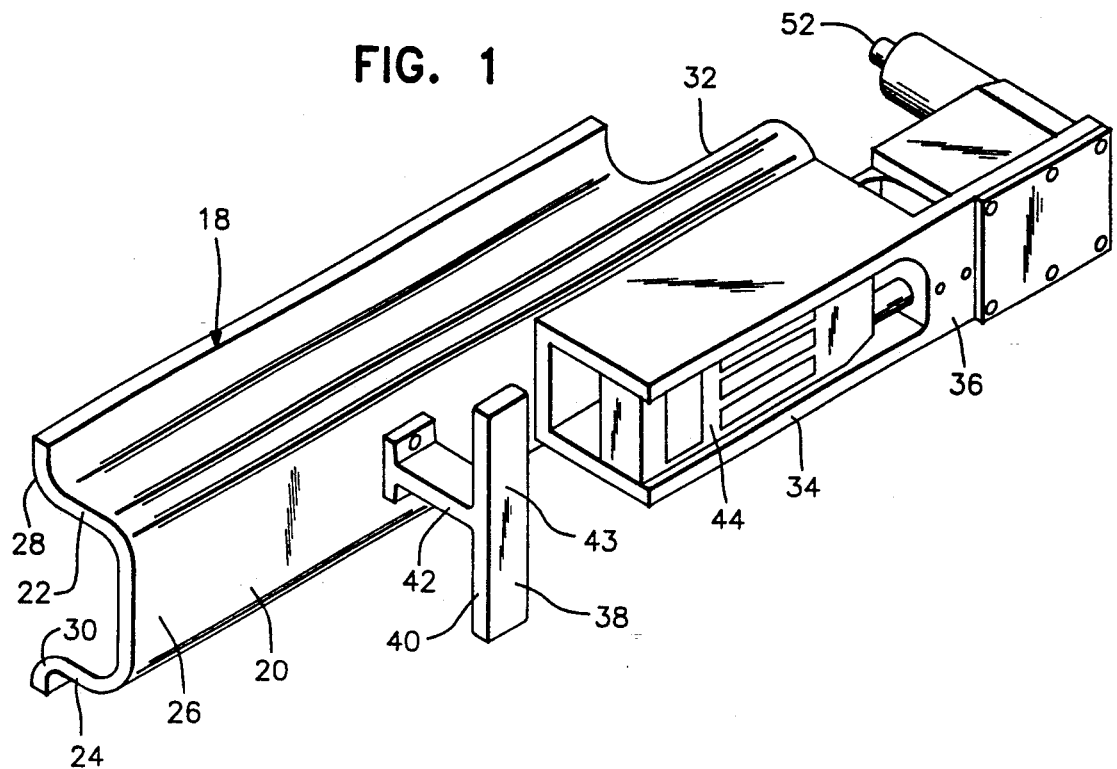
FIG. 1 is a perspective view of the gauge of the instant invention in position for horizontal displacement toward and exposed vertical side of a horizontal pres cylinder.

Referring now more specifically to the drawings the numeral 10 generally designates a typical press including a blanket cylinder 12 having a blanket 14 mounted thereon with packing 16 disposed on the cylinder 12 beneath the blanket 14.

The gauge of the instant invention is generally designated by the reference numeral 18 and includes an elongated base 20 in the form of a channel member defining a pair of parallel sides or flanges 22 and 24 interconnected along corresponding marginal edges by a bight portion 26, the free longitudinal marginal edges of the flanges 22 and 24 being curved outwardly away from each other as at 28 and 30.

The flanges 22 and 24 are abbreviated at one end 32 of the base or channel member 30 and a housing 34 is supported from the bight portion 26 at the one end 32 with a first end 36 of the elongated housing 34 projecting endwise outwardly of the one end 32.

The longitudinal mid-portion of the body or channel member 20 defined between the unabbreviated portions of the flanges 22 and 24 includes a T-handle 38 mounted thereon with the cross piece 40 of the handle 38 disposed transverse to the longitudinal axis of the body or channel member 20 and the shank 42 of the handle 38 disposed generally radially of the cylinder 12.

With attention now invited more specifically to FIGS. 3 and 4 of the drawings, a digital (LCD) indicator gauge 44 is removably mounted within the housing 34 and includes a reciprocal probe or spindle 46 projecting into a separate cavity 48 defined within the first end 36 of the housing 34. A tubular boss 50 projects outwardly from the side of the housing 34 which faces in the direction in which the body or channel member 20 opens and freely reciprocally receives an actuating shaft or probe 52 therethrough, the bore 54 formed through the boss 50 opening into the cavity 48.

The end of the shaft or probe 52 which projects into the cavity 48 includes a snap ring abutment 56 removably mounted thereon and a fully collapsible coil spring 58 is disposed about the shaft or probe 52 between the snap ring abutment 56 and the inner surface of the cavity 48 through which the bore 54 opens, the spring 58 serving to inwardly displace the shaft or probe 52 when viewed in FIG. 3.

A transverse shaft 60 is journaled through the opposite sides 62 and 64 of the housing 34 and is retained against axial shifting through the utilization of removable snap rings 66 and 68, the longitudinal mid-portion of the shaft 60 having a bellcrank 70 mounted thereon for oscillation therewith within the cavity 48 by a set screw 72. The arms 74 and 76 of the bellcrank 70 include enlarged rounded ends 78 and 80 which abut the adjacent terminal ends of the spindle 46 and the probe 52 and a butterfly spring 82 has one arm thereof pivotally anchored to the arm 76 as at 84 and the other arm thereof pivotally anchored as at 86 to a removable plug 88 carried by the end wall 90 of the housing 34.

The butterfly spring 82, when viewed as positioned in FIG. 3, biases the bellcrank 70 in a clockwise direction, but such clockwise movement is resisted by the spring 58. However, when the bellcrank is angularly displaced in a clockwise direction from the position thereof illustrated in FIG. 3 past the plane 92 passing through the center axis of the shaft 60 and the pivotal connection between the spring 82 and the plug 88, the spring 82 bias the bellcrank 70 in a counter clockwise direction. Further, as may be seen from FIG. 4, one end of the shaft 60 projecting upwardly of the side 64 of the housing 34 has a thumb wheel 96 mounted thereon for a purpose to be hereinafter more fully set forth.

The indicator 44 may comprise any suitable digital indicator, but a particularly well suited indicator comprising the Mitutoyo IDU Digimatic Indicator, series 575 indicator is here shown. This indicator includes an off switch, an on-zero switch and In./mm switch. Further, the indicator includes spring means which exerts an outward force of substantially 5 ozs. on the spindle 46.

The spring 58, when compressed as shown in FIG. 3, exerts an inward force of approximately 5 ozs. on the probe 52 and the spring 82 exerts a force of substantially 10 ozs. between points 84 and 86.

Figure 2:
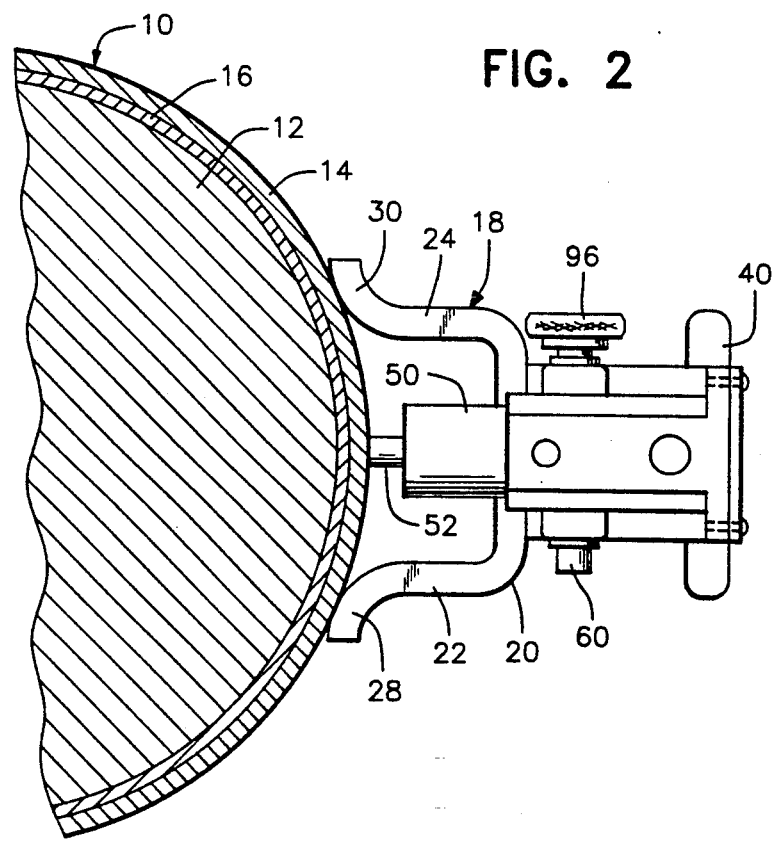
FIG. 2 is an end elevational view of the gauge as seen from the reciprocal probe end thereof with the gauge in position against a blanket cylinder of a press, the blanket cylinder, attendant blanket and packing being fragmentally illustrated in vertical section.

With attention invited to FIG. 2, as the bellcrank 70 is rotated counterclockwise from the position thereof illustrated in FIG. 3, the pressure of the spring 58 acting upon the probe 52 decrease and the pressure of the spring 82 acting upon the bellcrank 70 decreases. Conversely, when the bellcrank 70 is rotated in a counterclockwise direction from the position thereof illustrated in FIG. 3, the pressure exerted by the spring 58 on the probe 52 increases and the pressure of the spring 82 acting upon the bellcrank 70 increases. The strength of the springs 58 and 82 as well as the positioning of the points 84 and 86 is determined in advance in order to ensure substantially constant outward pressure on the probe 52 throughout its range of useful movement. This allows constant accurate reading of the thickness of a blanket throughout a reasonable range of blanket thicknesses. In addition, when the probe 52 is positioned as illustrated in FIG. 3, the lower end thereof lies every so slightly beneath a plane containing the undersurfaces of the curved marginal portions 28 and 30 of the flanges 22 and 24. Thus, the thickness of padding or a blanket lying upon a plane surface also may be determined utilizing the packing gauge of the instant invention. The thumb wheel 96 may be used to manually turn the shaft 60 in order to inwardly retract the probe 52.

Further, inasmuch as the cross piece 40 of the T-handle 38 is spaced appreciably outward of the bight portion 26 and disposed transverse thereto, the handle crosspiece 40 including a longitudinal mid-portion 43 (see FIG. 1) disposed between parallel planes paralleling the shaft or probe 52 and extending along the contact zones of the curved portions 28 and 30 of the flanges 22 and 24 with the blanket 14. When the cross piece 40 is gripped by the user's hand and the gauge 18 has force supplied thereto through the cross piece 40 along the length of the shank 42 in a direction to the left as viewed in FIG. 2, the gauge 18 will tend to fully evenly contact the blanket 14 with its curved marginal portions 28 and 30, thus enabling the gauge 18 to obtain a correct reading as to the thickness of the blanket 14. Further, when the gauge 18 is used along the length and about the circumference of the blanket 14 in order to locate specific areas of the packing which may be thinner than other areas, an extremely accurate reading is obtained by the gauge 18.

Although FIG. 3 illustrates one method of providing a precise, constant pressure movement connection between the probe 52 and the spindle 46, it is to be understood that other mechanisms may be found to accomplish the same function. The main function of such a movement connection is to provide an equal movement connection between the probe 52 and the spindle 46 while maintaining constant outward pressure on the probe 52.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalence may be resorted to falling within the scope of the invention.

What is claimed as new is as follows:

1. A press packing gauge including an elongated body having first and second opposite sides, said first side including a pair of elongated, laterally spaced apart and outwardly facing abutment surfaces extending longitudinally of said body throughout a major portion of the length thereof adjacent one end of said body, a sensor mounted from said body for reciprocation along a path at least substantially normal to a plane containing said abutment surfaces and operatively connected to indicator means mounted from said body for indicating distances said sensor is shifted along said path, and a handle mounted from said body and including an elongated hand grip portion spaced outward of said second side, generally paralleling said plane and disposed transverse to said body, said elongated hand grip portion including a longitudinal mid-portion disposed between laterally spaced planes paralleling said path and extending along said abutment surfaces.

2. The packing gauge of claim 1 wherein said hand grip portion longitudinal mid-portion is support from said body by an elongated shank generally paralleling said path.

3. The packing gauge of claim 1 wherein said body comprises an elongated channel member opening outward of said first side and including a pair of generally parallel flanges interconnected by a bight portion extending therebetween.

4. The packing gauge of claim 3 wherein said indicator means is supported from said bight portion.

5. The packing gauge of claim 4 wherein said indicator means includes an elongated actuating spindle reciprocal lengthwise of said body, said path of movement of said sensor, when said gauge is in position against one vertical side of a horizontal press cylinder, being horizontal, said gauge including a bellcrank supported therefrom for oscillation about an axis transverse to said path and body and including first and second generally right angularly disposed lever arms whose free ends are abutted, laterally, by said spindle and sensor, respectively.

6. The packing gauge of claim 5 wherein said sensor includes effective limits of reciprocation, said bellcrank, when said sensor is generally centered between said limits of reciprocation, being positioned with said first arm paralleling said path and said second arm disposed to transverse to said path.

7. In a gauge including an elongated body incorporating an elongated sensor guidingly lengthwise reciprocal transversely of said body and an elongated indicator spindle lengthwise reciprocal longitudinally of said body, a motion transmission connection between said sensor and said indicator spindle including a bellcrank supported from said body for oscillation about an axis normal to a plane in which said sensor and spindle are reciprocal and including first and second substantially right angulated arms disposed in said plane with said first arm abutted, laterally, against one end of said spindle and said second arm abutted, laterally, against one end of said sensor, first means connected between said sensor and body yielding biasing said sensor toward said second arm, second means connected between said bell crank and body yielding biasing said bellcrank in a direction to swing said second arm toward said sensor to thereby oppose said first means, and third means connected between said indicator spindle and body yieldingly biasing said indicator spindle toward said first arm.

8. The gauge of claim 7 wherein said first means comprises a coil spring and said second means comprises a butterfly spring.

9. The gauge of claim 7 wherein said body comprises an elongated channel member having first and second opposite sides, said channel member opening outwardly of said first side, said sensor being reciprocal outward and inward of said first side and said spindle being reciprocal longitudinally of said channel member.

10. The gauge of claim 9 including a handle mounted from said channel member and including an elongated hand grip portion spaced outward of said second side and disposed transverse to said channel member.

11. The gauge of claim 10 wherein said elongated hand grip portion is disposed in a plane paralleling said channel member and disposed transverse to the direction in which said channel member opens.

12. The gauge of claim 11 wherein said elongated handgrip portion includes a longitudinal mid-portion supported from said channel member through the utilization of a support shank disposed generally normal to said elongated hand grip portion and said plane.

* * * * *